(12) United States Patent
Baek et al.

(10) Patent No.: US 11,996,047 B2
(45) Date of Patent: May 28, 2024

(54) POWER SUPPLY UNIT, DISPLAY DEVICE INCLUDING THE SAME, AND METHOD FOR DRIVING POWER SUPPLY UNIT

(71) Applicant: Samsung Display Co., LTD., Yongin-si (KR)

(72) Inventors: Eunryeol Baek, Seoul (KR); Sungchun Park, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/132,264

(22) Filed: Apr. 7, 2023

(65) Prior Publication Data

US 2023/0410743 A1 Dec. 21, 2023

(30) Foreign Application Priority Data

Jun. 17, 2022 (KR) .......................... 10-2022-0074107

(51) Int. Cl.
*H02M 1/00* (2006.01)
*G09G 3/3233* (2016.01)
*H02M 3/156* (2006.01)

(52) U.S. Cl.
CPC ........ *G09G 3/3233* (2013.01); *H02M 1/0009* (2021.05); *H02M 3/156* (2013.01); *G09G 2300/0842* (2013.01); *G09G 2310/08* (2013.01); *G09G 2330/021* (2013.01); *G09G 2330/028* (2013.01)

(58) Field of Classification Search
None
See application file for complete search history.

(56) References Cited

U.S. PATENT DOCUMENTS

2020/0152121 A1* 5/2020 Sung .................... G09G 3/3275

FOREIGN PATENT DOCUMENTS

| CN | 205564447 U | * | 9/2016 | ............... G05F 3/08 |
| KR | 101962176 B1 | | 3/2019 | |

OTHER PUBLICATIONS

Translation of CN-205564447-U into English; Murase. (Year: 2016).*

* cited by examiner

*Primary Examiner* — Brian M Butcher
(74) *Attorney, Agent, or Firm* — CANTOR COLBURN LLP

(57) ABSTRACT

A power supply unit includes: a first DC-DC converter that generates a first power supply voltage and a second DC-DC converter that generates a second power supply voltage. The second DC-DC converter includes an inductor, a mode selector that receives at least one signal including information on an inductance value of the inductor and generates an inductor selection driving signal based on the at least one signal, and a feedback loop that receives the inductor selection driving signal and changes a parameter value for generating a current flowing through the inductor based on the inductor selection driving signal.

27 Claims, 15 Drawing Sheets

FIG. 5

| NAME | Description |
|---|---|
| HWS | 0:4.7uH internal setting |
| | 1:2.2uH internal setting |

| NAME | Description |
|---|---|
| SWS | 0:4.7uH internal setting |
| | 1:2.2uH internal setting |

POWER SUPPLY UNIT, DISPLAY DEVICE INCLUDING THE SAME, AND METHOD FOR DRIVING POWER SUPPLY UNIT

This application claims priority to Korean Patent Application No. 10-2022-0074107 filed on Jun. 17, 2022, and all the benefits accruing therefrom under 35 U.S.C. § 119, the content of which in its entirety is herein incorporated by reference.

BACKGROUND

1. Field

The present invention relates to a power supply unit, a display device including the power supply unit, and a method of driving the power supply unit.

2. Description of the Related Art

A flat panel display device is used as a display device for replacing a cathode ray tube display device due to lightweight and thin characteristics thereof. As representative examples of such a flat panel display device, there are a liquid crystal display device, an organic light emitting display device, a quantum dot display device, and the like.

The display device may include a plurality of pixels, and may include a power supply unit configured to generate a power supply voltage to provide the power supply voltage to the pixels. The power supply unit may include a direct current (DC)-DC converter, and the DC-DC converter may include an inductor configured to generate a current corresponding to the power supply voltage. When the display device is manufactured, an inductance value of the inductor may be determined to enable driving with a maximum load according to a type of the display device (e.g., a display device with a high specification or a low specification), and in order to generate a current corresponding to the inductor, the DC-DC converter may include a feedback loop including a preset parameter value. For example, the preset parameter value of the feedback loop determined when the display device is manufactured may not be changed. However, when the inductor is changed due to a change in the maximum load required for the display device, a current sensing value of the inductor may be changed due to a change in an inductance, and an oscillation phenomenon may occur in the power supply voltage output from the power supply unit.

SUMMARY

Some embodiments provide a power supply unit.

Some embodiments provide a display device including the power supply unit.

Some embodiments provide a method of driving the power supply unit.

According to embodiments, a power supply unit includes: a first DC-DC converter configured to generate a first power supply voltage and a second DC-DC converter configured to generate a second power supply voltage. Here, the second DC-DC converter may include an inductor, a mode selector configured to receive at least one signal including information on an inductance value of the inductor and to generate an inductor selection driving signal based on the at least one signal, and a feedback loop configured to receive the inductor selection driving signal and to change a parameter value for generating a current flowing through the inductor based on the inductor selection driving signal.

In embodiments, the at least one signal including the information of the inductance value of the inductor may include a first signal including one of a first mode and a second mode, the first mode may correspond to an inductor having a first inductance value, and the second mode may correspond to an inductor having a second inductance value.

In embodiments, whether the first signal include the first mode or the second mode may be determined according to a connection state of a pin of the power supply unit.

In embodiments, the at least one signal including the information of the inductance value of the inductor may include a second signal including one of a first mode and a second mode, the first mode may correspond to the inductor having the first inductance value, and the second mode may correspond to the inductor having the second inductance value.

In embodiments, whether the second signal includes in the first mode or the second mode may be determined according to a selection of a user.

In embodiments, the inductor selection driving signal may include a first inductor selection driving signal or a second inductor selection driving signal. In addition, the first inductor selection driving signal may include information for generating a current corresponding to the inductor having the first inductance value. Further, the second inductor selection driving signal may include information for generating a current corresponding to the inductor having the second inductance value.

In embodiments, the mode selector may generate the first inductor selection driving signal or the second inductor selection driving signal based on the first signal and the second signal.

In embodiments, the mode selector may generate the first inductor selection driving signal when the first mode of the first signal and the first mode of the second signal are received, may generate the second inductor selection driving signal when the first mode of the first signal and the second mode of the second signal are received, may generate the first inductor selection driving signal when the second mode of the first signal and the first mode of the second signal are received, and may generate the second inductor selection driving signal when the second mode of the first signal and the second mode of the second signal are received.

In embodiments, the feedback loop may include a loop compensator and a current sensing trimmer.

In embodiments, the loop compensator may include a variable resistor and a variable capacitor.

In embodiments, the loop compensator may receive the inductor selection driving signal, may vary the variable resistor into a resistor having a resistance value corresponding to the inductor, and may vary the variable capacitor into a capacitor having a capacitance corresponding to the inductor.

In embodiments, the current sensing trimmer may receive the inductor selection driving signal and may vary a trimming range corresponding to the inductor.

In embodiments, the feedback loop may generate a parameter change signal including changed parameter information.

In embodiments, the second DC-DC converter may further includes a switch connected to the inductor and a pulse generator configured to receive the parameter change signal, to generate a gate pulse signal based on the parameter change signal, and to control the switch based on the gate pulse signal.

According to embodiments, a display device includes: a power supply unit including a first DC-DC converter configured to generate a first power supply voltage and a second DC-DC converter configured to generate a second power supply voltage, and a display panel including pixels to which the first and second power supply voltages are provided. Here, the second DC-DC converter may include an inductor, a mode selector configured to receive at least one signal including information on an inductance value of the inductor and to generate an inductor selection driving signal based on the at least one signal, and a feedback loop configured to receive the inductor selection driving signal and to change a parameter value for generating a current flowing through the inductor based on the inductor selection driving signal.

In embodiments, the at least one signal including the information of the inductance value of the inductor may include a first signal including one of a first mode and a second mode, the first mode may correspond to an inductor having a first inductance value, and the second mode may correspond to an inductor having a second inductance value. In addition, whether the first signal includes the first mode or the second mode may be determined according to a connection state of a pin of the power supply unit.

In embodiments, the at least one signal including the information of the inductance value of the inductor may include a second signal including one of a first mode and a second mode, the first mode may correspond to the inductor having the first inductance value, and the second mode may correspond to the inductor having the second inductance value. In addition, whether the second signal includes the first mode or the second mode may be determined according to a selection of a user.

In embodiments, the inductor selection driving signal may include a first inductor selection driving signal or a second inductor selection driving signal. In addition, the first inductor selection driving signal may include information for generating a current corresponding to the inductor having the first inductance value. Further, the second inductor selection driving signal may include information for generating a current corresponding to the inductor having the second inductance value.

In embodiments, the feedback loop may include a loop compensator and a current sensing trimmer. In addition, the loop compensator may include a variable resistor and a variable capacitor.

In embodiments, the loop compensator may receive the inductor selection driving signal, may vary the variable resistor into a resistor having a resistance value corresponding to the inductor, and may vary the variable capacitor into a capacitor having a capacitance corresponding to the inductor. In addition, the current sensing trimmer may receive the inductor selection driving signal and may vary a trimming range corresponding to the inductor.

According to embodiments, a method for driving a power supply unit may include receiving first and second signals, providing a first inductor selection driving signal or a second inductor selection driving signal to a feedback loop based on the first and second signals, and changing a parameter value of a DC-DC converter based on the first or second inductor selection driving signal.

In embodiments, when the feedback loop receives the first inductor selection driving signal, the feedback loop may change a parameter value of the DC-DC converter, which is for generating a current flowing through a first inductor. In addition, when the feedback loop receives the second inductor selection driving signal, the feedback loop may change a parameter value of the DC-DC converter, which is for generating a current flowing through a second inductor.

In embodiments, changing the parameter value of the DC-DC converter based on the first or second inductor selection driving signal may include generating a parameter change signal including changed parameter information, providing the parameter change signal to a pulse generator, and generating a gate pulse signal based on the parameter change signal.

In embodiments, after receiving the first and second signals, the method may further includes checking a value of the second signal when the first signal is a first value, performing driving the DC-DC converter with the first inductor selection driving signal corresponding to a first inductor when the value of the second signal is a third value, performing driving the DC-DC converter with the second inductor selection driving signal corresponding to a second inductor when the value of the second signal is a fourth value, turning off pixels, checking a value of the first signal when the pixels are turned off, performing driving the DC-DC converter with the first inductor selection driving signal corresponding to the first inductor when the value of the first signal is the first value, and performing driving the DC-DC converter with the second inductor selection driving signal corresponding to the second inductor when the value of the first signal is a second value.

In embodiments, an inductance value of the first inductor and an inductance value of the second inductor may be different from each other.

In embodiments, after receiving the first and second signals, the method may further includes checking a value of the second signal when the first signal is the second value, performing driving the DC-DC converter with the first inductor selection driving signal corresponding to a first inductor when the value of the second signal is the third value, and performing driving the DC-DC converter with the second inductor selection driving signal corresponding to a second inductor when the value of the second signal is the fourth value.

In embodiments, before receiving the first and second signals, the method may further includes turning on the power supply unit and checking a current connection state of a hardware pin of the power supply unit.

Therefore, a display device according to embodiments may include a mode selector configured to generate first and second inductor selection driving signals, and a feedback loop configured to change a parameter value of a second DC-DC converter, which is for generating a current corresponding to an inductor, based on the first and second inductor selection driving signals, so that even when the inductor is changed after the display device is manufactured, the second DC-DC converter can generate a current corresponding to the changed inductor. Accordingly, an oscillation phenomenon of an output voltage of the second DC-DC converter or a malfunction of the second DC-DC converter can be effectively prevented from occurring in the display device.

In addition, the display device can exhibit relatively high efficiency, and power consumption of the display device can be relatively reduced. In other words, a lifespan of a battery of the display device can be relatively increased.

BRIEF DESCRIPTION OF THE DRAWINGS

FIG. 5 is a diagram for describing a first signal and a second signal in FIG. 4.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, embodiments of the present disclosure will be explained in detail with reference to the accompanying drawings.

Figure 1:
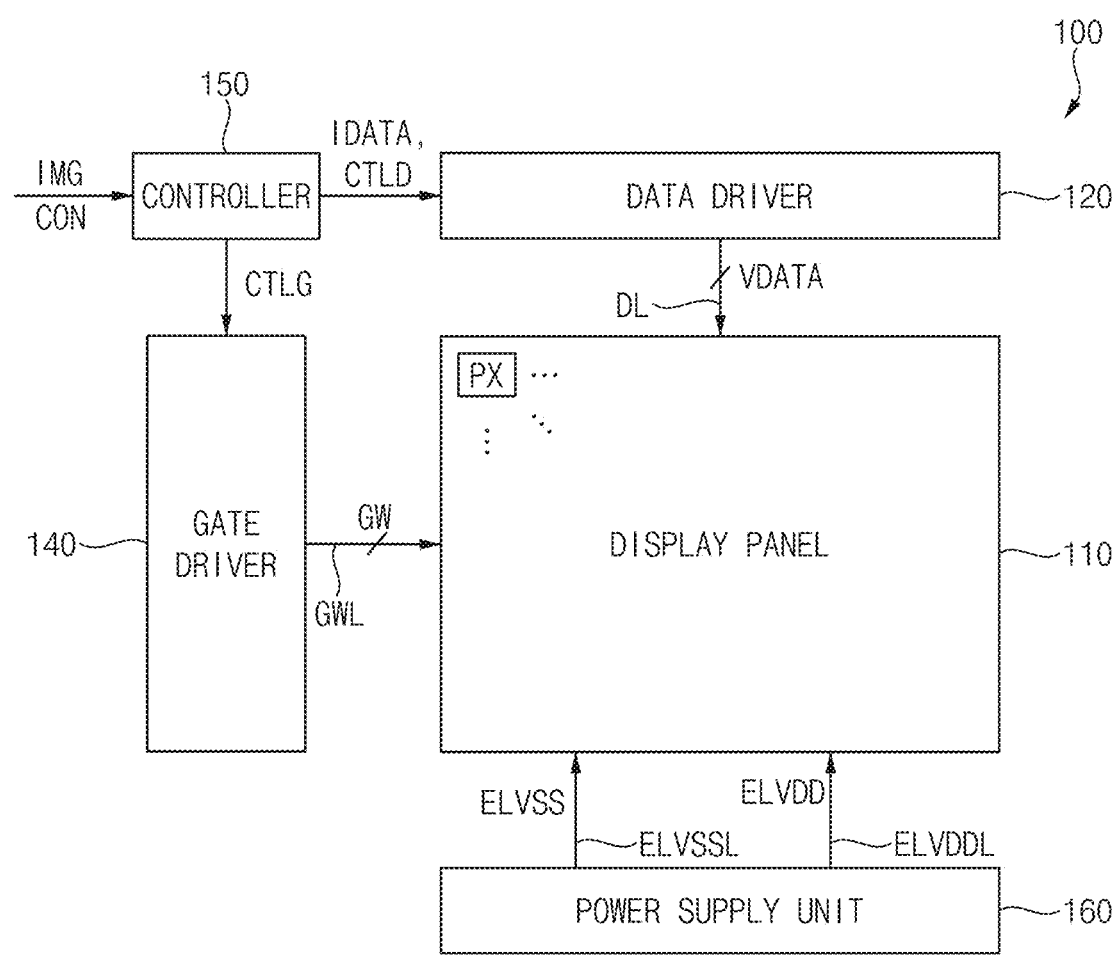
FIG. 1 is a block diagram illustrating a display device according to embodiments.

FIG. 1 is a block diagram illustrating a display device according to embodiments.

Referring to FIG. 1, a display device 100 may include a display panel 110 including a plurality of pixels PX, a controller 150, a data driver 120, a gate driver 140, a power supply unit 160, and the like.

The display panel 110 may include a plurality of data lines DL, a plurality of gate lines GWL, a first power supply voltage line ELVDDL, a second power supply voltage line ELVSSL, and a plurality of pixels PX connected to the lines. Each of the pixels PX may include at least two pixel transistors, at least one pixel capacitor, and a light emitting element, and the display panel 110 may be a light emitting display panel. According to embodiments, the display panel 110 may be a display panel of an organic light emitting display device ("OLED"). According to other embodiments, the display panel 110 may include a display panel of an inorganic light emitting display device ("ILED"), a display panel of a quantum dot display device ("QDD"), a display panel of a liquid crystal display device ("LCD"), a display panel of a field emission display device ("FED"), a display panel of a plasma display device ("PDP"), or a display panel of an electrophoretic display device ("EPD").

The controller 150 (e.g., a timing controller ("T-CON")) may receive image data IMG and an input control signal CON from an external host processor (e.g., an application processor ("AP"), a graphic processing unit ("GPU"), or a graphic card). The image data IMG may be RGB image data (or RGB pixel data) including red image data (or red pixel data), green image data (or green pixel data), and blue image data (or blue pixel data). In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (e.g., dynamic capacitance compensation ("DCC"), etc.) for correcting image quality to the image data IMG supplied from the external host processor. In some embodiments, when the controller 150 does not include an algorithm for improving image quality, the image data IMG may be output as the input image data IDATA. The controller 150 may supply the input image data IDATA to the data driver 120.

The controller 150 may generate a data control signal CTLD for controlling an operation of the data driver 120 and a gate control signal CTLG for controlling an operation of the gate driver 140 based on the input control signal CON. For example, the gate control signal CTLG may include a vertical start signal, gate clock signals, and the like, and the data control signal CTLD may include a horizontal start signal, a data clock signal, and the like.

The gate driver 140 may generate gate signals GW based on the gate control signal CTLG received from the controller 150. The gate driver 140 may output the gate signals GW to the pixels PX connected to the gate lines GWL, respectively.

The power supply unit 160 may generate a first power supply voltage ELVDD and a second power supply voltage ELVSS, and may provide the first power supply voltage ELVDD and the second power supply voltage ELVSS to the pixels PX through the first power supply voltage line ELVDDL and the second power supply voltage line ELVSSL. According to the embodiments, the power supply unit 160 may be implemented in a form of an integrated circuit ("IC"), and may be mounted on the display device 100. For example, the power supply unit 160 may include a power management integrated circuit ("PMIC").

The data driver 120 may receive the data control signal CTLD and the input image data IDATA from the controller 150. The data driver 120 may convert digital input image data IDATA into an analog data voltage by using a gamma reference voltage generated by a gamma reference voltage generator (not shown). In this case, the analog data voltage obtained by the conversion will be defined as a data voltage VDATA. The data driver 120 may output data voltages VDATA to the pixels PX connected to the data lines DL based on the data control signal CTLD. According to other embodiments, the data driver 120 and the controller 150 may be implemented as a single integrated circuit, and such an integrated circuit may be referred to as a timing controller-embedded data driver ("TED").

Figure 2:
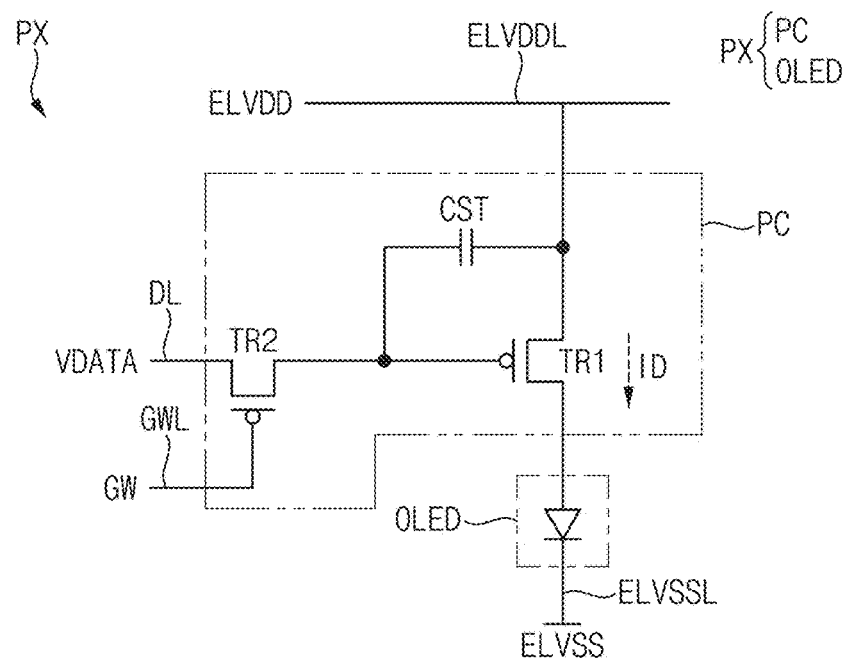
FIG. 2 is a circuit diagram illustrating pixels included in the display device of FIG. 1.

FIG. 2 is a circuit diagram illustrating pixels included in the display device of FIG. 1.

Referring to FIG. 2, the display device 100 may include a pixel PX, and the pixel PX may include a pixel circuit PC and an organic light emitting element OLED (or a light emitting element). In this case, the pixel circuit PC may include first and second pixel transistors TR1 and TR2, a pixel storage capacitor CST, and the like. In addition, the pixel circuit PC or the organic light emitting element OLED may be connected to the first power supply voltage line ELVDDL, the second power supply voltage line ELVSSL, the data line DL, the gate line GWL, and the like. The first pixel transistor TR1 may correspond to a driving transistor, and the second pixel transistor TR2 may correspond to a switching transistor. Each of the first and second pixel transistors TR1 and TR2 may include a first terminal, a second terminal, and a gate terminal. According to the embodiments, the first terminal may be a source terminal, and the second terminal may be a drain terminal. In some embodiments, the first terminal may be a drain terminal, and the second terminal may be a source terminal.

According to the embodiments, each of the first and second pixel transistors TR1 and TR2 may be a PMOS transistor, and may have a channel including polysilicon. According to other embodiments, each of the first and second pixel transistors TR1 and TR2 may be an NMOS transistor, and may have a channel including a metal oxide semiconductor. According to still other embodiments, the first pixel transistor TR1 may be a PMOS transistor, and the second pixel transistor TR2 may be an NMOS transistor.

The organic light emitting element OLED may output a light based on a driving current ID. The organic light emitting element OLED may include a first terminal and a second terminal. According to the embodiments, the first terminal of the organic light emitting element OLED may receive the first power supply voltage ELVDD, and the second terminal of the organic light emitting element OLED may receive the second power supply voltage ELVSS. In this case, the first power supply voltage ELVDD and the second power supply voltage ELVSS may be provided from the power supply unit 160 through the first power supply voltage line ELVDDL and the second power supply voltage line ELVSSL, respectively. For example, the first terminal of the organic light emitting element OLED may be an anode terminal, and the second terminal of the organic light emitting element OLED may be a cathode terminal. In some embodiments, the first terminal of the organic light emitting element OLED may be a cathode terminal, and the second terminal of the organic light emitting element OLED may be an anode terminal.

The first power supply voltage ELVDD may be applied to the first terminal of the first pixel transistor TR1. The second terminal of the first pixel transistor TR1 may be connected to the first terminal of the organic light emitting element OLED. The data voltage VDATA may be applied to the gate terminal of the first pixel transistor TR1. In this case, the data voltage VDATA may be provided from the data driver 120 through the data line DL.

The first pixel transistor TR1 may generate the driving current ID. According to the embodiments, the first pixel transistor TR1 may operate in a saturation region. In this case, the first pixel transistor TR1 may generate the driving current ID based on a voltage difference between the gate terminal and the source terminal of the first pixel transistor TR1. In addition, gray levels may be expressed based on a magnitude of the driving current ID supplied to the organic light emitting element OLED. In some embodiments, the first pixel transistor TR1 may operate in a linear region. In this case, the gray levels may be expressed based on a sum of a time during which the driving current is supplied to the organic light emitting element OLED within one frame.

The gate terminal of the second pixel transistor TR2 may receive the gate signal GW. In this case, the gate signal GW may be provided from the gate driver 140 through the gate line GWL. The first terminal of the second pixel transistor TR2 may receive the data voltage VDATA. The second terminal of the second pixel transistor TR2 may be connected to the gate terminal of the first pixel transistor TR1. The second pixel transistor TR2 may supply the data voltage VDATA to the gate terminal of the first pixel transistor TR1 during an activation period of the gate signal GW. In this case, the second pixel transistor TR2 may operate in a linear region.

The pixel storage capacitor CST may be connected between the first power supply voltage line ELVDDL and the gate terminal of the first pixel transistor TR1. The pixel storage capacitor CST may include a first terminal and a second terminal. For example, the first terminal of the pixel storage capacitor CST may receive the first power supply voltage ELVDD, and the second terminal of the pixel storage capacitor CST may be connected to the gate terminal of the first pixel transistor TR1.

The pixel storage capacitor CST may maintain a voltage level of the gate terminal of the first pixel transistor TR1 during an inactivation period of the gate signal GW. Therefore, the driving current ID generated by the first pixel transistor TR1 may be supplied to the organic light emitting element OLED based on the voltage level maintained by the pixel storage capacitor CST.

However, although the pixel circuit PC according to the present disclosure has been described as including one driving transistor, one switching transistor, and one storage capacitor, the configuration of the present disclosure is not limited thereto. For another example, the pixel circuit PC may have a configuration including at least one driving transistor, at least two switching transistors, and at least one storage capacitor.

In addition, although the light emitting element included in the pixel PX according to the present disclosure has been described as including the organic light emitting element OLED, the configuration of the present disclosure is not limited thereto. For another example, the light emitting element may include a quantum dot ("QD") light emitting element, an inorganic light emitting diode, and the like.

Figure 3:
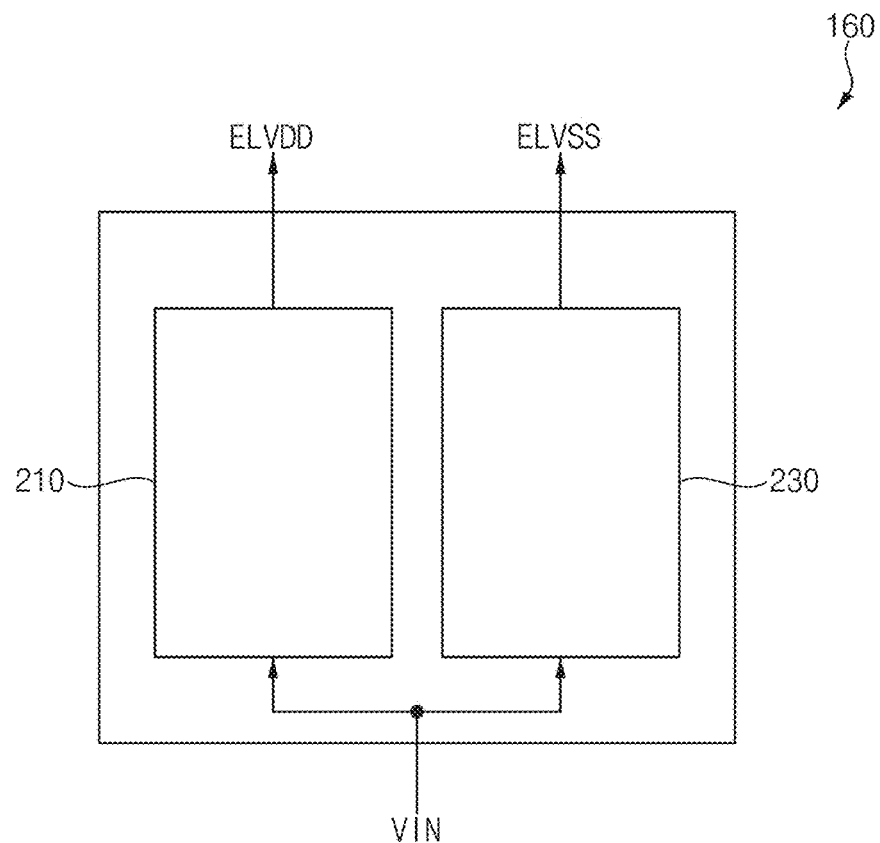
FIG. 3 is a block diagram illustrating a power supply unit included in the display device of FIG. 1.

FIG. 3 is a block diagram illustrating a power supply unit included in the display device of FIG. 1.

Referring to FIG. 3, the power supply unit 160 may include a first DC-DC converter 210 and a second DC-DC converter 230.

The first DC-DC converter 210 may receive an input voltage VIN to generate the first power supply voltage ELVDD, and the first direct current (DC)-DC converter 210 may provide the first power supply voltage ELVDD to the pixel PX. According to the embodiments, a first voltage level of the first power supply voltage ELVDD and a second voltage level of the second power supply voltage ELVSS may be different from each other. The first voltage level may be higher than the second voltage level.

The second DC-DC converter 230 may receive the input voltage VIN to generate the second power supply voltage ELVSS, and the second DC-DC converter 230 may provide the second power supply voltage ELVSS to the pixel PX. According to other embodiments, the power supply unit 160 may include one first DC-DC converter 210 configured to generate the first power supply voltage ELVDD, and at least two second DC-DC converters 230 configured to generate the second power supply voltage ELVSS.

Each of the first DC-DC converter 210 and the second DC-DC converter 230 may include a buck converter, a buck boost converter, an inverting buck boost converter, and the like.

Figure 4:
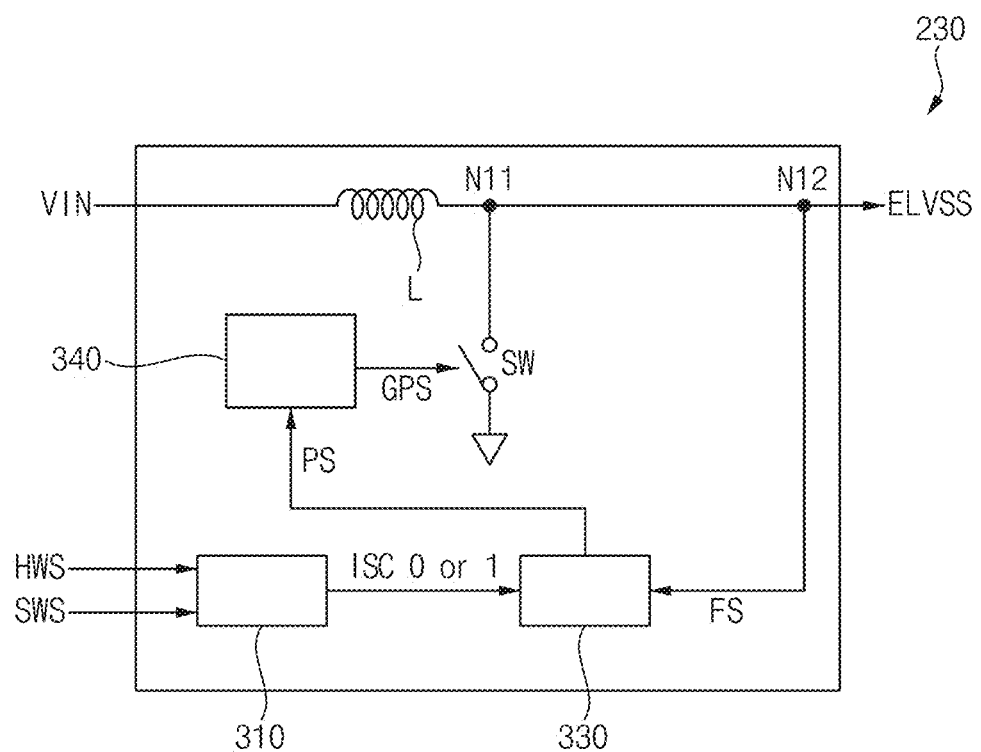
FIG. 4 is a block diagram for describing a second DC-DC converter in FIG. 3.
Figure 6A:
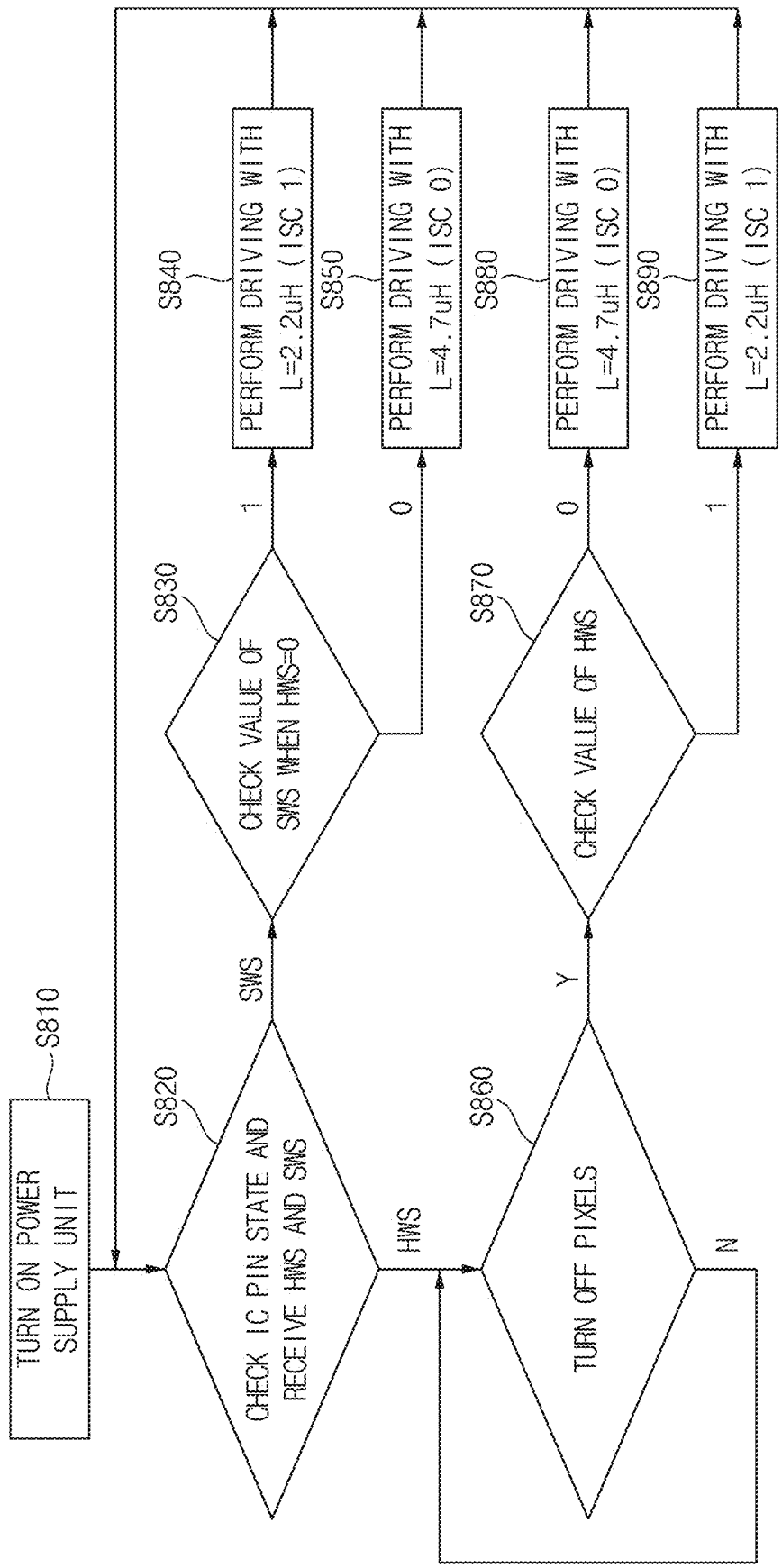
FIGS. 6A and 6B are flowcharts for describing a scheme of driving a second DC-DC converter in FIG. 4.
Figure 6B:
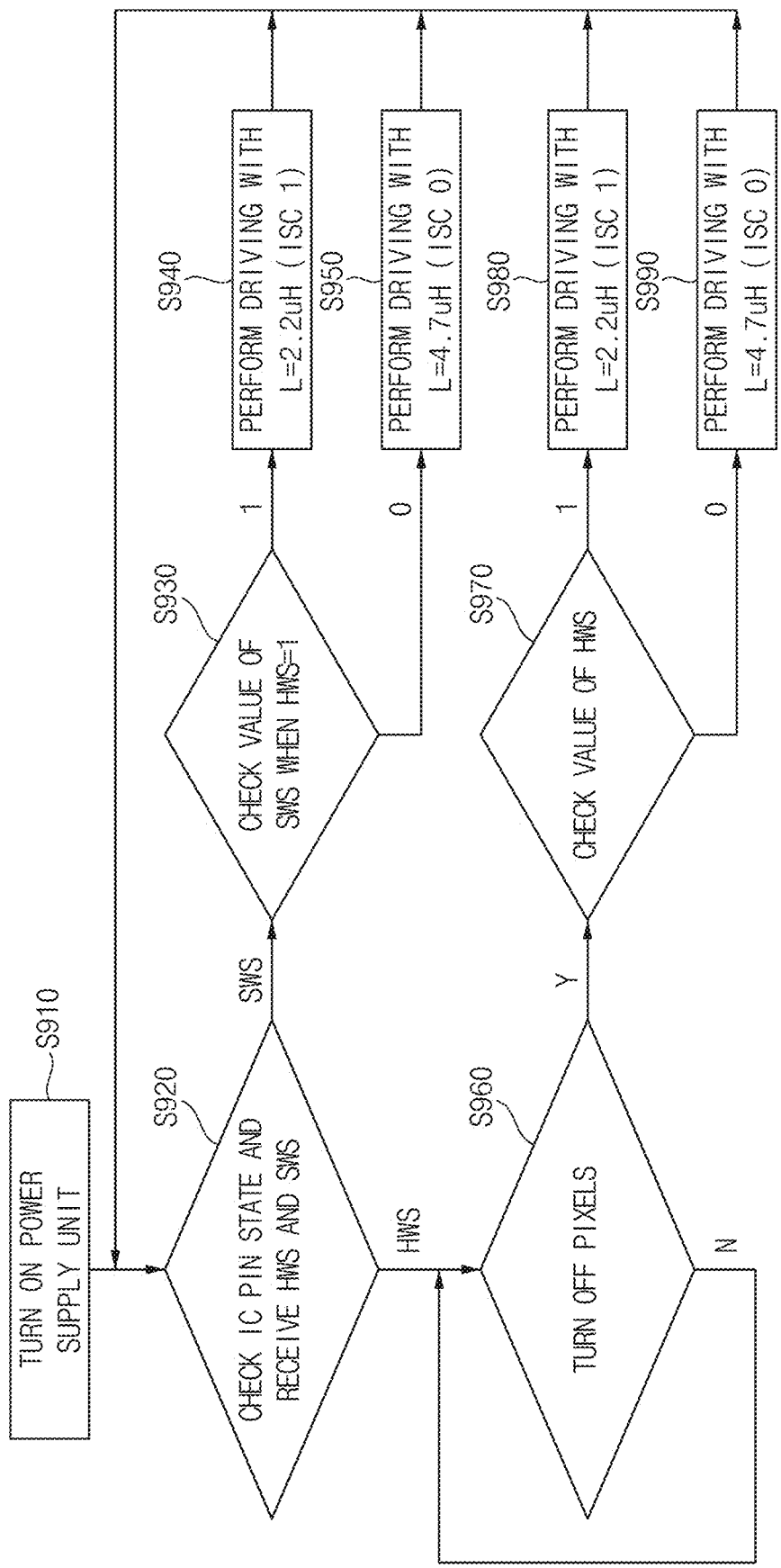

FIG. 4 is a block diagram for describing a second DC-DC converter in FIG. 3, FIG. 5 is a diagram for describing a first signal and a second signal in FIG. 4, and FIGS. 6A and 6B are flowcharts for describing a scheme of driving a second DC-DC converter in FIG. 4.

Referring to FIGS. FIGS. 4, 5, 6A, and 6B, the second DC-DC converter 230 may include a mode selector 310, a feedback loop 330, a pulse generator 340, an inductor L, a switch SW, and the like.

A first signal HWS and a second signal SWS may be provided to the mode selector 310. According to other embodiments, only the first signal HWS may be provided to the mode selector 310 depending on a type of the display device 100.

As shown in FIG. 5, the first signal HWS may include a first mode 0 or a second mode 1. The first mode 0 of the first signal HWS may mean a state in which the inductor L is set as an inductor having a high value, for example, about 4.7 microhenries (μH), and the second mode 1 of the first signal HWS may mean a state in which the inductor L is set as an inductor having a low value, for example, about 2.2 μH. Hereinafter, for convenience of description, a case that the high value is 4.7 μH and the low value is 2.2 μH is described as an example. However, the numerical values of the high value and the low value are not limited thereto if the high value is greater than the low value. The first signal HWS may be generated by the power supply unit 160, and the first signal HWS may operate in the first mode 0 or the second mode 1 according to a current connection state of a pin of hardware (or an IC) (i.e., a connection state of a pin of the power supply unit 160). That is, whether the first signal HWS includes the first mode 0 or the second mode 1 may be determined according to the connection state of the pin of the power supply unit 160. For example, the power supply unit 160 may be implemented in a form of an integrated circuit, and a state of one of pins of the integrated circuit may be changed according to a type of the inductor L. The power supply unit 160 may select the first mode 0 of the first signal HWS or the second mode 1 of the first signal HWS according to the state of the pin.

During a manufacturing process of the display device 100, the inductor L of the power supply unit 160 may be implemented as an inductor having an inductance of 4.7 μH or an inductor having an inductance of 2.2 μH.

For example, when the display device 100 is a display device driven with a high specification (i.e., a high load) (e.g., a maximum current of the power supply unit 160 is 500 to 600 milliamperes (mA)), the inductor L may be implemented as an inductor having 4.7 μH. In this case, the first signal HWS may have the first mode 0.

In addition, when the display device 100 is a display device driven with a low specification (i.e., a low load) (e.g., the maximum current of the power supply unit 160 is 1 ampere (A)), the inductor L may be implemented as an inductor having 2.2 μH. In this case, the first signal HWS may have the second mode 1.

Referring again to FIG. 5, the second signal SWS may include a first mode 0 or a second mode 1. The first mode 0 of the second signal SWS may mean a state in which the inductor L is set as an inductor having 4.7 μH, and the second mode 1 of the second signal SWS may mean a state in which the inductor L is set as an inductor having 2.2 μH. For example, when the first signal HWS is the first mode 0, and the second signal SWS is the first mode 0, the inductor L of the second DC-DC converter 230 may include an inductor having 4.7 μH. When the first signal HWS is the first mode 0, and the second signal SWS is the second mode 1, the inductor L of the second DC-DC converter 230 may include an inductor having 2.2 μH. When the first signal HWS is the second mode 1, and the second signal SWS is the first mode 0, the inductor L of the second DC-DC converter 230 may include an inductor having 4.7 μH. When the first signal HWS is the second mode 1, and the second signal SWS is the second mode 1, the inductor L of the second DC-DC converter 230 may include an inductor having 2.2 μH. In other words, the second signal SWS may have priority over the first signal HWS. The second signal SWS may be generated by the controller 150, and the second signal SWS may operate in the first mode 0 or the second mode 1 according to a selection of a user of the display device 100. The second signal SWS may be a signal in an I2C communication scheme.

Referring again to FIG. 4, the mode selector 310 may generate first and second inductor selection driving signals ISC0 and ISC1 based on the first signal HWS and the second signal SWS. For example, the first inductor selection driving signal ISC0 may include information for generating a current corresponding to the inductor L having 4.7 μH, and the second inductor selection driving signal ISC1 may include information for generating a current corresponding to the inductor L having 2.2 μH. The mode selector 310 may provide the first and second inductor selection driving signals ISC0 and ISC1 to the feedback loop 330.

As shown in FIG. 6A, a scheme of driving the second DC-DC converter 230 may include: turning on a power supply unit 160 (S810); checking a current connection state of a hardware pin of the power supply unit 160, and receiving first and second signals HWS and SWS (S820); checking a value of the second signal SWS when the first signal HWS is 0 (S830); performing driving the second DC-DC converter 230 with a second inductor selection driving signal ISC1 corresponding to an inductor L having 2.2 μH when the value of the second signal SWS is 1 (S840); performing driving the second DC-DC converter 230 with a first inductor selection driving signal ISC0 corresponding to the inductor L having 4.7 μH when the value of the second signal SWS is 0 (S850); turning off pixels PX (S860); checking a value of the first signal HWS when the pixels PX are turned off (S870); performing driving the second DC-DC converter 230 with the first inductor selection driving signal ISC0 corresponding to the inductor L having 4.7 μH when the value of the first signal HWS is 0 (S880); and performing driving the second DC-DC converter 230 with the second inductor selection driving signal ISC1 corresponding to the inductor L having 2.2 µH when the value of the first signal HWS is 1 (S890).

After the power supply unit 160 is turned on, the power supply unit 160 may check the current connection state of the hardware pin. After the power supply unit 160 checks the current connection state of the hardware pin, the power supply unit 160 may generate the first signal HWS. The controller 150 may generate the second signal SWS according to the selection of the user of the display device 100. For example, when the inductor L having 4.7 µH is set in the second DC-DC converter 230, the power supply unit 160 may select the first mode 0 of the first signal HWS, and the user may also select the first mode 0 of the second signal SWS.

The mode selector 310 may receive the first signal HWS and the second signal SWS. When the first signal HWS is the first mode 0, the mode selector 310 may determine whether the second signal SWS is the first mode 0 or the second mode 1. When the second signal SWS is the first mode 0, the mode selector 310 may generate the first inductor selection driving signal ISC0 corresponding to the inductor L having 4.7 µH.

In some embodiments, when there is a short circuit or an open in some of pins of hardware to cause the power supply unit 160 to incorrectly check the current connection state of the hardware pin to generate an erroneous signal, the user may select a mode that is different from the mode of the first signal HWS. For example, when the inductor L having 2.2 µH is set in the second DC-DC converter 230 while the power supply unit 160 selects the first mode of the first signal HWS, the user may select the second mode 1 of the second signal SWS so that the mode selector 310 may generate the second inductor selection driving signal ISC1 corresponding to the inductor L having 2.2 µH. When taking the above point into consideration, an operation may be performed by giving priority to the second signal SWS on a system of the mode selector 310.

According to other embodiments, the mode selector 310 may not receive the second signal SWS. For example, depending on the type of display device 100, the controller 150 may not generate the second signal SWS. In this case, when the pixels PX are turned off in the display device 100, the mode selector 310 may check the value of the first signal HWS so as to generate the first inductor selection driving signal ISC0 corresponding to the inductor L having 4.7 µH when the value of the first signal HWS is 0, or generate the second inductor selection driving signal ISC1 corresponding to the inductor L having 2.2 µH when the value of the first signal HWS is 1.

As shown in FIG. 6B, a scheme of driving the second DC-DC converter 230 may include: turning on a power supply unit 160 (S910); checking a current connection state of a hardware pin, and receiving first and second signals HWS and SWS (S920); checking a value of the second signal SWS when the first signal HWS is 1 (S930); performing driving the second DC-DC converter 230 with a second inductor selection driving signal ISC1 corresponding to an inductor L having 2.2 µH when the value of the second signal SWS is 1 (S940); performing driving the second DC-DC converter 230 with a first inductor selection driving signal ISC0 corresponding to the inductor L having 4.7 µH when the value of the second signal SWS is 0 (S950); turning off pixels PX (S960); checking a value of the first signal HWS when the pixels PX are turned off (S970); performing driving the second DC-DC converter 230 with the first inductor selection driving signal ISC0 corresponding to the inductor L having 4.7 µH when the value of the first signal HWS is 0 (S980); and performing driving the second DC-DC converter 230 with the second inductor selection driving signal ISC1 corresponding to the inductor L having 2.2 µH when the value of the first signal HWS is 1 (S990).

After the power supply unit 160 is turned on, the power supply unit 160 may check the current connection state of the hardware pin. After the power supply unit 160 checks the current connection state of the hardware pin, the power supply unit 160 may generate the first signal HWS. The controller 150 may generate the second signal SWS according to the selection of the user of the display device 100. For example, when the inductor L having 2.2 µH is set in the second DC-DC converter 230, the power supply unit 160 may select the second mode 1 of the first signal HWS, and the user may also select the second mode 1 of the second signal SWS.

The mode selector 310 may receive the first signal HWS and the second signal SWS. When the first signal HWS is the second mode 1, the mode selector 310 may determine whether the second signal SWS is the first mode 0 or the second mode 1. When the second signal SWS is the second mode 1, the mode selector 310 may generate the second inductor selection driving signal ISC1 corresponding to the inductor L having 2.2 µH.

In some embodiments, when there is a short circuit or an open in some of pins of hardware to cause the power supply unit 160 to incorrectly check the current connection state of the hardware pine to generate an erroneous signal, the user may select a mode that is different from the mode of the first signal HWS. For example, when the inductor L having 4.7 µH is set in the second DC-DC converter 230 while the power supply unit 160 selects the second mode 1 of the first signal HWS, the user may select the first mode 0 of the second signal SWS so that the mode selector 310 may generate the first inductor selection driving signal ISC0 corresponding to the inductor L having 4.7 µH. When taking the above point into consideration, an operation may be performed by giving priority to the second signal SWS on a system of the mode selector 310.

According to other embodiments, the mode selector 310 may not receive the second signal SWS. For example, depending on the type of display device 100, the controller 150 may not generate the second signal SWS. In this case, when the pixels PX are turned off in the display device 100, the mode selector 310 may check the value of the first signal HWS so as to generate the first inductor selection driving signal ISC0 corresponding to the inductor L having 4.7 µH when the value of the first signal HWS is 0, or generate the second inductor selection driving signal ISC1 corresponding to the inductor L having 2.2 µH when the value of the first signal HWS is 1.

According to other embodiments, after the display device 100 is manufactured, the inductor L having 2.2 µH may be replaced with the inductor L having 4.7 µH (or the inductor L having 4.7 µH may be replaced with the inductor L having 2.2 µH). Even in this case, according to the scheme of driving the mode selector 310 as described above, the mode selector 310 may generate the first inductor selection driving signal ISC0 or the second inductor selection driving signal ISC1 corresponding to the inductor L.

Referring again to FIG. 4, the feedback loop 330 may receive the first inductor selection driving signal ISC0 or the second inductor selection driving signal ISC1. For example, when the feedback loop 330 receives the first inductor selection driving signal ISC0, the feedback loop 330 may change (or vary) a parameter value of the second DC-DC converter 230, which is for generating a current corresponding to (or flowing through) the inductor L having 4.7 µH. In addition, when the feedback loop 330 receives the second inductor selection driving signal ISC1, the feedback loop 330 may change a parameter value of the second DC-DC converter 230, which is for generating a current corresponding to the inductor L having 2.2 µH. The feedback loop 330 may generate a parameter change signal PS including changed parameter information, and provide the parameter change signal PS to the pulse generator 340.

The parameter change signal PS may be applied to the pulse generator 340, and the pulse generator 340 may generate a gate pulse signal GPS based on the parameter change signal PS. The pulse generator 340 may control the switch SW through the gate pulse signal GPS. For example, the gate pulse signal GPS may be a pulse width modulation signal, and the pulse generator 340 may adjust pulse widths or a duty cycle of the switch SW. In other words, the pulse generator 340 may generate a gate pulse signal GPS for generating a current corresponding to the inductor L having 2.2 µH, or a gate pulse signal GPS for generating a current corresponding to the inductor L having 4.7 µH.

A first end of the inductor L may be connected to an input terminal to which the input voltage VIN is applied. A second end of the inductor L may be connected to a first node N11. The inductor L may include an inductor having 2.2 µH or an inductor having 4.7 µH depending on the type of display device 100 (e.g., a high specification or a low specification).

A first terminal of the switch SW may be connected to a ground, and a second terminal of the switch SW may be connected to the first node N11. A gate terminal of the switch SW may receive the gate pulse signal GPS from the pulse generator 340. The switch SW may be repeatedly turned on and off based on the gate pulse signal GPS, so that the switch SW may generate a current corresponding to an inductance of the inductor L according to the type of the inductor L.

An output terminal through which the second power supply voltage ELVSS is output may be connected to a second node N12, and the second node N12 may be connected to the first node N11.

The second node N12 and the feedback loop 330 may be connected to each other, and a feedback signal FS may be provided to the feedback loop 330. The feedback signal FS may correspond to the second power supply voltage ELVSS, and the feedback loop 330 may sense the second power supply voltage ELVSS through the feedback signal FS. For example, when the feedback loop 330 senses a voltage level that is lower than a preset voltage level of the second power supply voltage ELVSS, the parameter change signal PS for increasing an output voltage may be generated and provided to the pulse generator 340. Similarly, when the feedback loop 330 senses a voltage level that is higher than the preset voltage level of the second power supply voltage ELVSS, the parameter change signal PS for decreasing the output voltage may be generated and provided to the pulse generator 340.

For example, according to a conventional display device, a DC-DC converter of a power supply unit included in the conventional display device may have only a fixed inductor (e.g., an inductor having a preset inductance upon initial manufacture) and a parameter value corresponding to the fixed inductor. Accordingly, when the inductor needs to be replaced depending on a type of the conventional display device (e.g., replaced with an inductor having an inductance that is different from the preset inductance), the parameter value may not correspond to the replaced inductor, so that an oscillation phenomenon of the output voltage may occur, or a malfunction of the DC-DC converter may occur.

According to the embodiments of the present disclosure, the display device 100 may include a mode selector 310 configured to generate first and second inductor selection driving signals ISC0 and ISC1, and a feedback loop 330 configured to change a parameter value of a second DC-DC converter 230, which is for generating a current corresponding to an inductor L, based on the first and second inductor selection driving signals ISC0 and ISC1, so that even when the inductor L is changed after the display device 100 is manufactured, the second DC-DC converter 230 may generate a current corresponding to the changed inductor L. Accordingly, an oscillation phenomenon of an output voltage of the second DC-DC converter 230 or a malfunction of the second DC-DC converter 230 may be prevented from occurring in the display device 100.

However, although the second DC-DC converter 230 has been described as including one inductor L, one switch SW, and the like, the configuration of the present disclosure is not limited thereto. For another example, the second DC-DC converter 230 may include at least one inductor L, at least one switch SW, at least one capacitor, and the like.

In addition, although the inductor L has been described as including the inductor having 2.2 µH or the inductor having 4.7 µH, the configuration of the present disclosure is not limited thereto. For example, the inductor L may include inductors having various inductances.

In addition, although each of the first signal HWS and the second signal SWS has been described as including a configuration for selecting one of two modes, the configuration of the present disclosure is not limited thereto. For another example, each of the first signal HWS and the second signal SWS may have a configuration for selecting one of at least three modes.

In addition, although it has been described that the second DC-DC converter 230 includes one inductor L, and the inductor L is set as the inductor having 2.2 µH or the inductor having 4.7 µH, the configuration of the present disclosure is not limited thereto. For another example, the second DC-DC converter 230 may include a first inductor having 2.2 µH and a second inductor having 4.7 µH, the first and second inductors may be connected in parallel, and a first configuration in which the second DC-DC converter 230 includes the first inductor and a second configuration in which the second DC-DC converter 230 includes the second inductor may be included through a switch.

Furthermore, although the configurations of the mode selector 310 and the feedback loop 330 have been described as being included in the second DC-DC converter 230, the configuration of the present disclosure is not limited thereto. For another example, the configurations of the mode selector 310 and the feedback loop 330 may be included in the first DC-DC converter 210.

Figure 7:
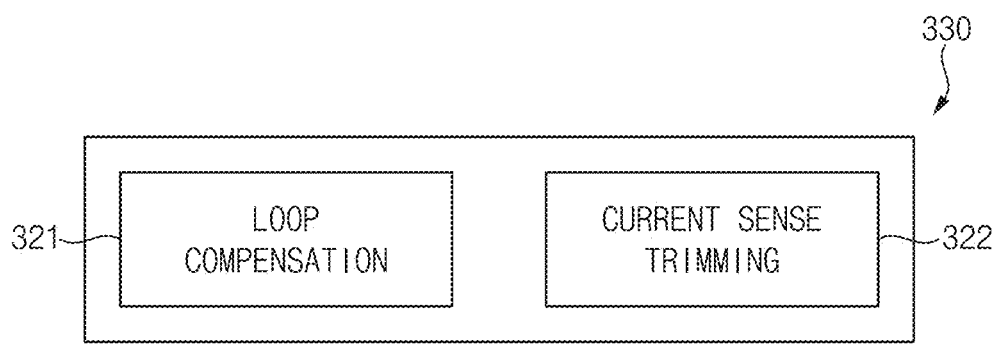
FIG. 7 is a block diagram for describing a feedback loop in FIG. 4.
Figure 8:
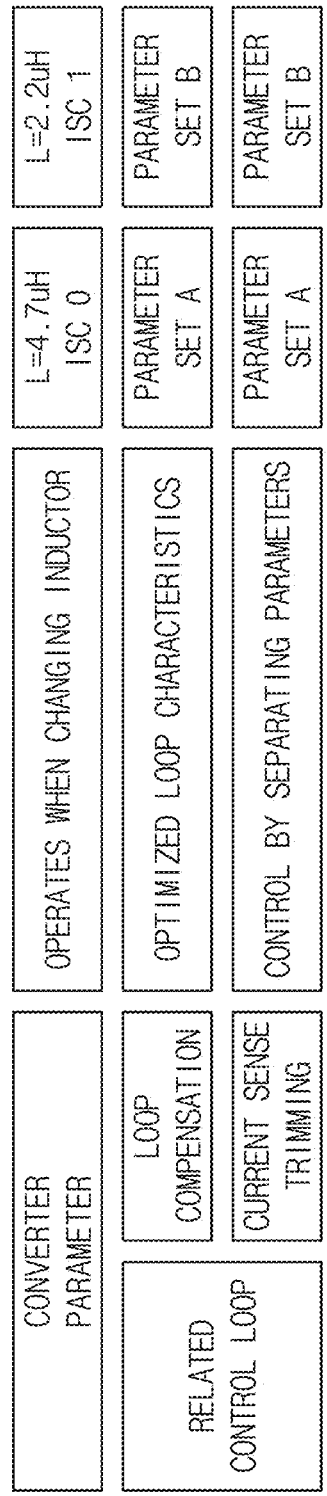
FIG. 8 is a diagram for describing loop compensation and current sensing trimming in FIG. 7.

FIG. 7 is a block diagram for describing a feedback loop in FIG. 4, and FIG. 8 is a diagram for describing loop compensation and current sensing trimming in FIG. 7.

Referring to FIGS. 7 and 8, the feedback loop 330 may include a loop compensator 321 and a current sensing trimmer 322.

The feedback loop 330 may control the loop compensator 321 and the current sensing trimmer 322 to generate the parameter change signal PS.

When the feedback loop 330 receives the first inductor selection driving signal ISC0, the loop compensator 321 may change the parameter value with a parameter set A, and the current sensing trimmer 322 may also change the parameter value with a parameter set A. The parameter set A of the loop compensator 321 may store a parameter value for generating a current corresponding to the inductor L having 4.7 µH. In addition, the parameter set A of the current sensing trimmer 322 may store a parameter value for generating a current corresponding to the inductor L having 4.7 µH.

When the feedback loop 330 receives the second inductor selection driving signal ISC1, the loop compensator 321 may change the parameter value with a parameter set B, and the current sensing trimmer 322 may also change the parameter value with a parameter set B. The parameter set B of the loop compensator 321 may store a parameter value for generating a current corresponding to the inductor L having 2.2 µH. In addition, the parameter set B of the current sensing trimmer 322 may store a parameter value for generating a current corresponding to the inductor L having 2.2 µH.

However, although the loop compensator 321 and the current sensing trimmer 322 have been described as having two parameters, the configuration of the present disclosure is not limited thereto. For another example, when each of the first signal HWS and the second signal SWS has the configuration for selecting one of the at least three modes, the loop compensator 321 and the current sensing trimmer 322 may also have a configuration for selecting one of at least three parameters.

Figure 9:
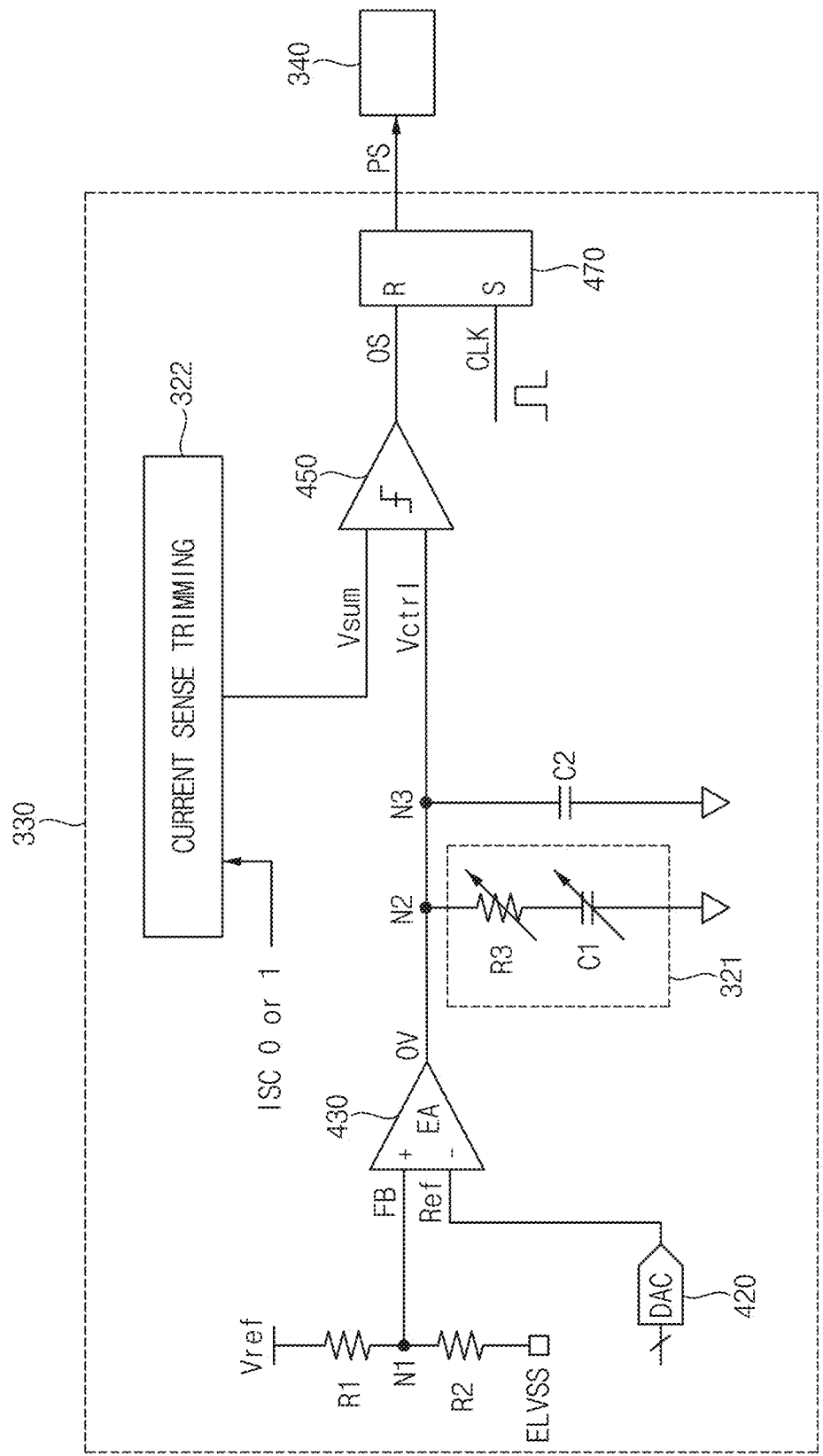
FIG. 9 is a circuit diagram for describing the feedback loop of FIG. 7.
Figure 10:
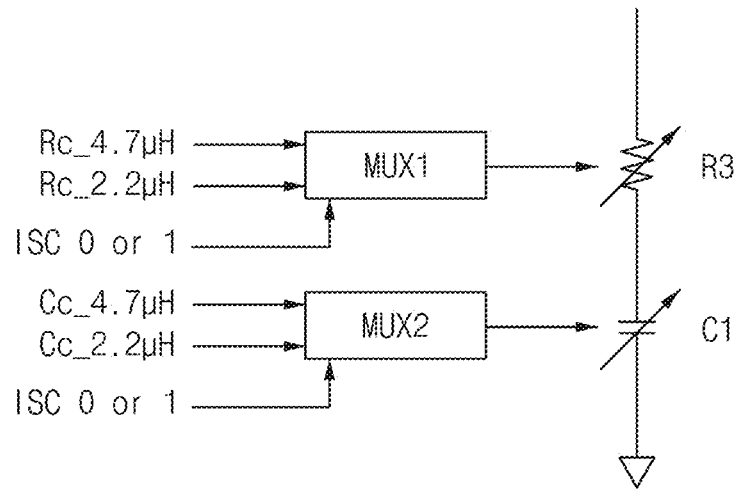
FIG. 10 is a circuit diagram for describing the loop compensation of FIG. 9.
Figure 11:
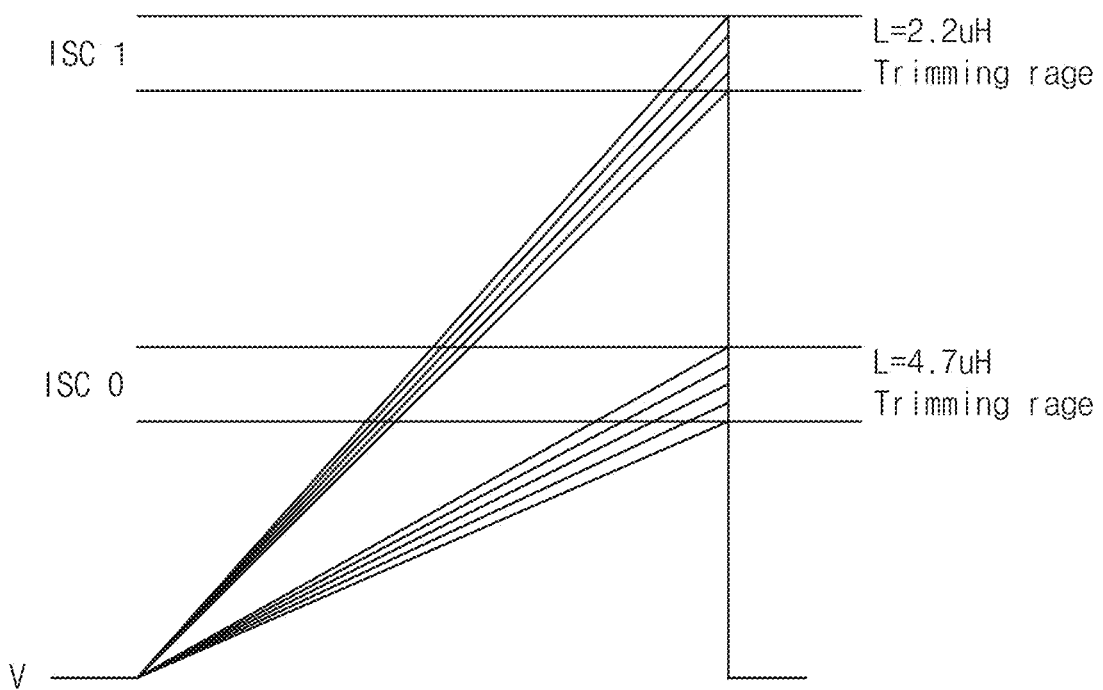
FIG. 11 is a diagram for describing the current sensing trimming of FIG. 9.

FIG. 9 is a circuit diagram for describing the feedback loop of FIG. 7, FIG. 10 is a circuit diagram for describing the loop compensation of FIG. 9, and FIG. 11 is a diagram for describing the current sensing trimming of FIG. 9.

Referring to FIGS. 9, 10, and 11, the feedback loop 330 may include a loop compensator 321, a current sensing trimmer 322, a first resistor R1, a second resistor R2, a digital-to-analog converter 420, an error amplifier 430, a second capacitor C2, a comparison amplifier 450, a latch 470, and the like.

A reference voltage Vref may be applied to a first end of the first resistor R1, and a second end of the first resistor R1 may be connected to a first node N1. A first end of the second resistor R2 may be connected to the first node N1, and the second power supply voltage ELVSS may be applied to a second end of the second resistor R2. In this case, the second power supply voltage ELVSS may correspond to the second power supply voltage ELVSS provided as the feedback signal FS.

A first terminal of the error amplifier 430 may be connected to the first node N1, and a feedback voltage FB corresponding to a voltage at the first node N1 may be applied to the first terminal of the error amplifier 430. A second terminal of the error amplifier 430 may be connected to the digital-to-analog converter 420, and a target voltage Ref provided from the digital-to-analog converter 420 may be applied to the second terminal of the error amplifier 430. The error amplifier 430 may output an output voltage OV based on the feedback voltage FB and the target voltage Ref.

The loop compensator 321 may be connected to a second node N2. The loop compensator 321 may include a third resistor R3 and a first capacitor C1. A first end of the third resistor R3 may be connected to the second node N2, and a second end of the third resistor R3 may be connected to the first capacitor C1. A first electrode of the first capacitor C1 may be connected to the third resistor R3, and a second electrode of the first capacitor C1 may be connected to the ground. According to the embodiments, the third resistor R3 may be a variable resistor, and the first capacitor C1 may be a variable capacitor. As shown in FIG. 10, the first inductor selection driving signal ISC0 or the second inductor selection driving signal ISC1 may be provided to a first mux Mux1 (or the loop compensator 321). In addition, the first inductor selection driving signal ISC0 or the second inductor selection driving signal ISC1 may be provided to a second mux Mux2 (or the loop compensator 321). When the first inductor selection driving signal ISC0 is provided to the first mux Mux1 and the second mux Mux2, the third resistor R3 may vary into a resistor having a resistance value corresponding to the inductor L having 4.7 µH, and the first capacitor C1 may vary into a capacitor having a capacitance corresponding to the inductor L having 4.7 µH. Similarly, when the second inductor selection driving signal ISC1 is provided to the first mux Mux1 and the second mux Mux2, the third resistor R3 may vary into a resistor having a resistance value corresponding to the inductor L having 2.2 µH, and the first capacitor C1 may vary into a capacitor having a capacitance corresponding to the inductor L having 2.2 µH. At the second node N2, the loop compensator 321 may compensate for the output voltage OV. The compensated output voltage OV may be defined as a compensation voltage Vctrl, and the compensation voltage Vctrl may be provided to a second terminal of the comparison amplifier 450.

Referring again to FIG. 9, a first electrode of the second capacitor C2 may be connected to a third node N3, and a second electrode of the second capacitor C2 may be connected to the ground. In this case, the third node N3 may be connected to the second node N2 and the second terminal of the comparison amplifier 450.

The current sensing trimmer 322 may be connected to a first terminal of the comparison amplifier 450. The first inductor selection driving signal ISC0 or the second inductor selection driving signal ISC1 may be provided to the current sensing trimmer 322. As shown in FIG. 11, when the first inductor selection driving signal ISC0 is provided to the current sensing trimmer 322, the current sensing trimmer 322 may vary a trimming range corresponding to the inductor L having 4.7 WI Similarly, when the second inductor selection driving signal ISC1 is provided to the current sensing trimmer 322, the current sensing trimmer 322 may vary a trimming range corresponding to the inductor L having 2.2 WI The current sensing trimmer 322 may generate a sum voltage Vsum including inclination information of the voltage, and the current sensing trimmer 322 may provide the sum voltage Vsum to the first terminal of the comparison amplifier 450.

Referring again to FIG. 9, the sum voltage Vsum may be applied to the first terminal of the comparison amplifier 450, and the compensation voltage Vctrl may be applied to the second terminal of the comparison amplifier 450. The comparison amplifier 450 may generate an output signal OS based on the sum voltage Vsum and the compensation voltage Vctrl, and the comparison amplifier 450 may provide the output signal OS to a first terminal of the latch 470.

The output signal OS may be applied to the first terminal of the latch 470, and a clock signal CLK may be applied to a second terminal of the latch 470. The latch 470 may generate the parameter change signal PS based on the output signal OS and the clock signal CLK, and the latch 470 may provide the parameter change signal PS to the pulse generator 340.

Figure 12:
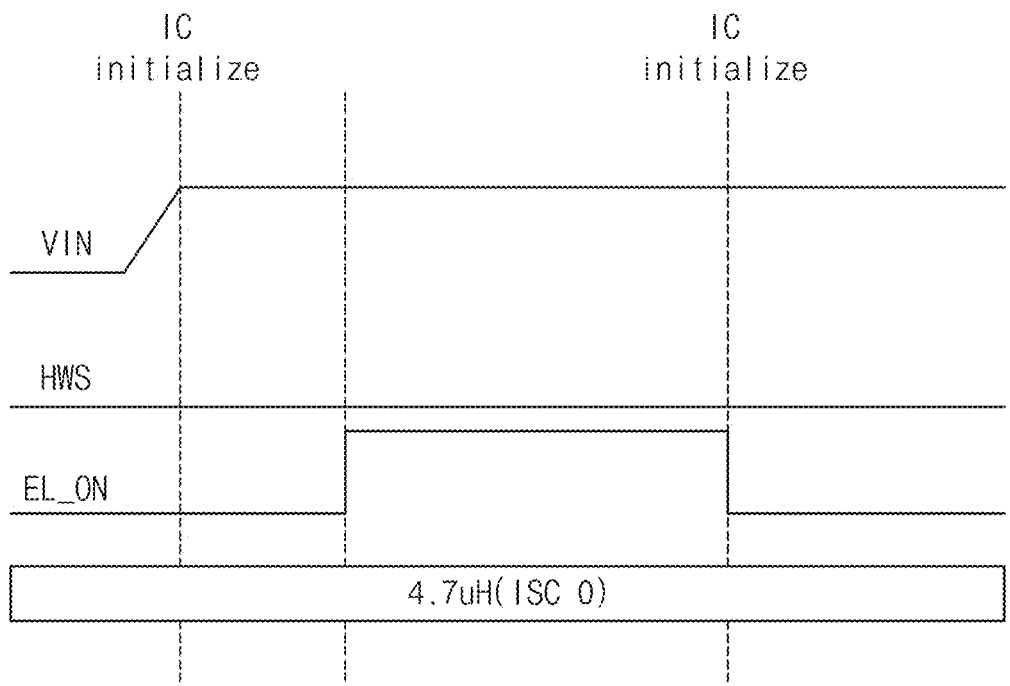
FIGS. 12 to 14 are timing diagrams for describing driving of the second DC-DC converter in FIG. 4.
Figure 13:
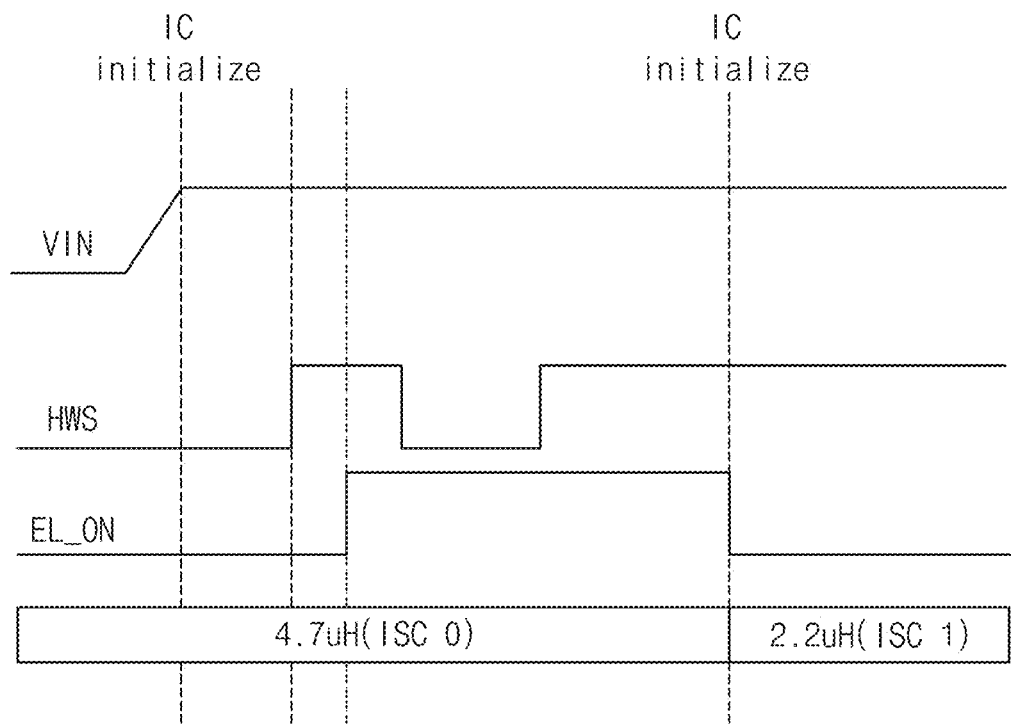
Figure 14:
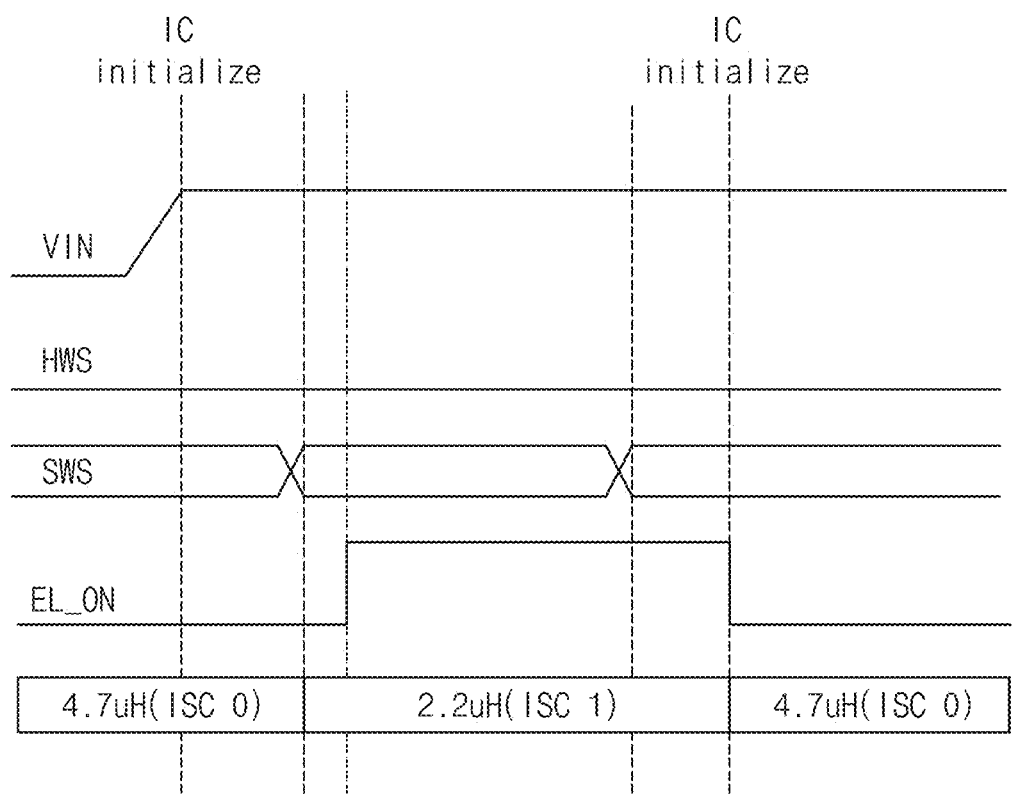

FIGS. 12 to 14 are timing diagrams for describing driving of the second DC-DC converter in FIG. 4.

Referring to FIG. 12, the inductor L having 4.7 µH may be set in the second DC-DC converter 230. The input voltage VIN may be applied to the second DC-DC converter 230. After the input voltage VIN is applied, the power supply unit 160 may be initialized. While the second DC-DC converter 230 is driven, the first signal HWS may not be applied. After the power supply unit 160 is initialized, the pixels PX of the display panel 110 may be turned on (EL_ON is high), and after a preset time, the pixels PX of the display panel 110 may be turned off (EL_ON is low). When the pixels PX of the display panel 110 are turned off, the power supply unit 160 may be initialized.

Referring to FIG. 13, the inductor L having 4.7 µH may be set in the second DC-DC converter 230. The input voltage VIN may be applied to the second DC-DC converter 230. After the input voltage VIN is applied, the power supply unit 160 may be initialized. After the power supply unit 160 is initialized, the first signal HWS may be provided (HWS is high) to the mode selector 310. The mode selector 310 may not generate the second inductor selection driving signal ISC1 for the first signal HWS provided after an initialization timing of the power supply unit 160. After the power supply unit 160 is initialized, the pixels PX of the display panel 110 may be turned on (EL_ON is high), and after a preset time, the pixels PX of the display panel 110 may be turned off (EL_ON is low). The first signal HWS may be provided to the mode selector 310 while the pixels PX of the display panel 110 are turned on. While the pixels PX of the display panel 110 are turned on, the mode selector 310 may not generate the second inductor selection driving signal ISC1. When the pixels PX of the display panel 110 are turned off, the power supply unit 160 may be initialized. The first signal HWS may be provided to the mode selector 310 at a timing when the pixels PX of the display panel 110 are turned off and a timing when the power supply unit 160 is initialized. At the timing when the pixels PX of the display panel 110 are turned off and the timing when the power supply unit 160 is initialized, the mode selector 310 may generate the second inductor selection driving signal ISC1, and the inductor L having 2.2 µH may be set in the second DC-DC converter 230.

Referring to FIG. 14, the inductor L having 4.7 µH may be set in the second DC-DC converter 230. The input voltage VIN may be applied to the second DC-DC converter 230. After the input voltage VIN is applied, the power supply unit 160 may be initialized. After the power supply unit 160 is initialized, the second signal SWS may be provided to the mode selector 310. The mode selector 310 may generate the second inductor selection driving signal ISC1 for the second signal SWS provided after the initialization timing of the power supply unit 160, and the inductor L having 2.2 µH may be set in the second DC-DC converter 230. After the inductor L having 2.2 µH is set in the second DC-DC converter 230, the pixels PX of the display panel 110 may be turned on (EL_ON is high), and after a preset time, the pixels PX of the display panel 110 may be turned off (EL_ON is low). The second signal SWS may be provided to the mode selector 310 while the pixels PX of the display panel 110 are turned on. While the pixels PX of the display panel 110 are turned on, the mode selector 310 may perform masking without generating the first inductor selection driving signal ISC0. For example, when the mode selector 310 generates the first inductor selection driving signal ISC0 while the pixels PX of the display panel 110 are turned on, an overshoot, an undershoot, or the like of the output voltage may occur. When the pixels PX of the display panel 110 are turned off, the power supply unit 160 may be initialized. At the timing when the pixels PX of the display panel 110 are turned off and the timing when the power supply unit 160 is initialized, the mode selector 310 may generate the first inductor selection driving signal ISC0 based on the second signal SWS that has been masked, and the inductor L having 4.7 µH may be set in the second DC-DC converter 230.

Figure 15:
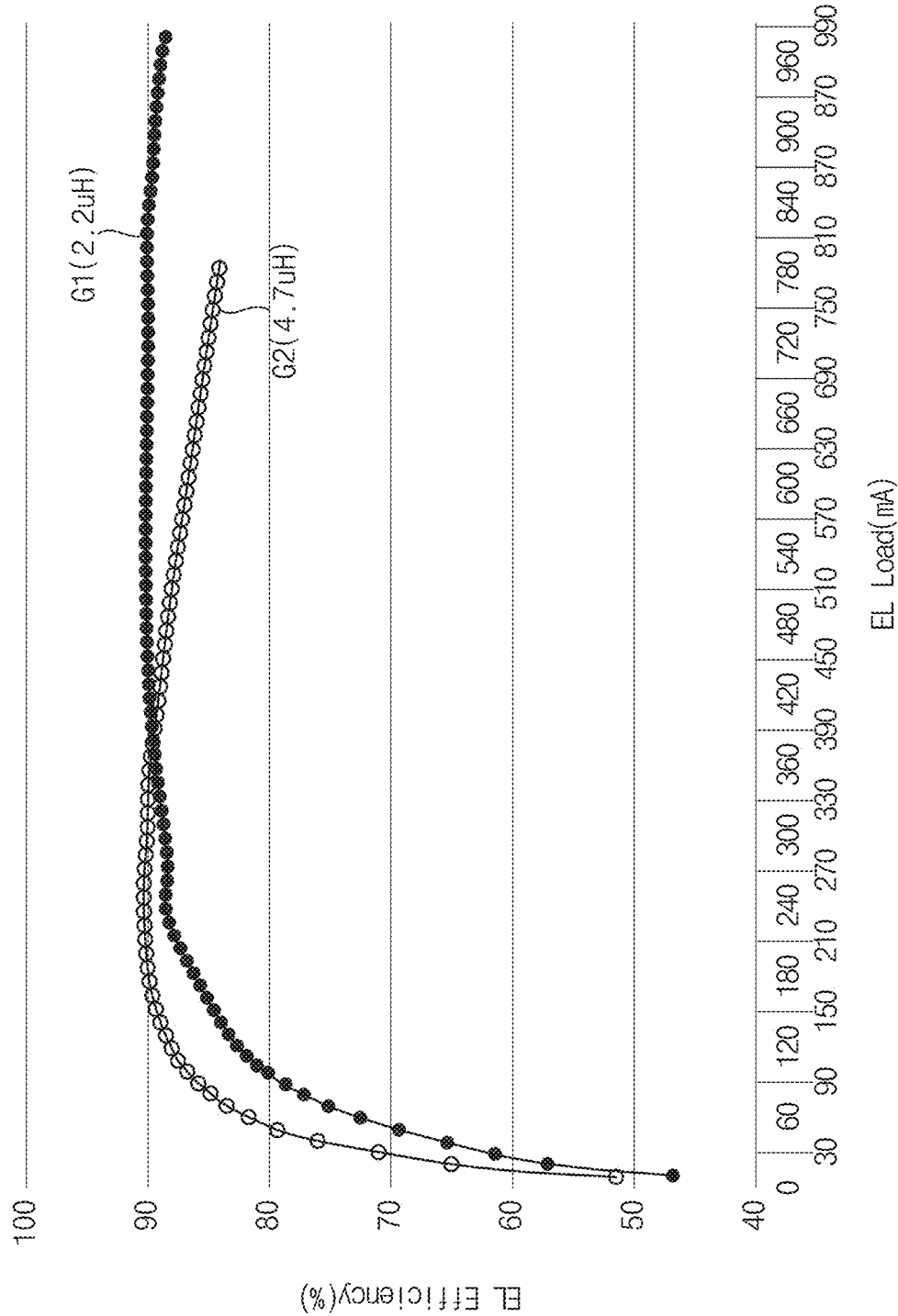
FIG. 15 is a graph showing efficiency with respect to a load of a first inductor and a second inductor according to Comparative Example.

FIG. 15 is a graph showing efficiency with respect to a load of a first inductor and a second inductor according to Comparative Example.

Referring to FIG. 15, a first graph G1 shows efficiency with respect to a load of the first inductor having 2.2 µH, and a second graph G2 shows efficiency with respect to a load of the second inductor having 4.7 µH.

As shown in the first graph G1, the first inductor may exhibit relatively high efficiency at a relatively high load. As shown in the second graph G2, the second inductor may exhibit relatively high efficiency at a relatively low load.

Figure 16:
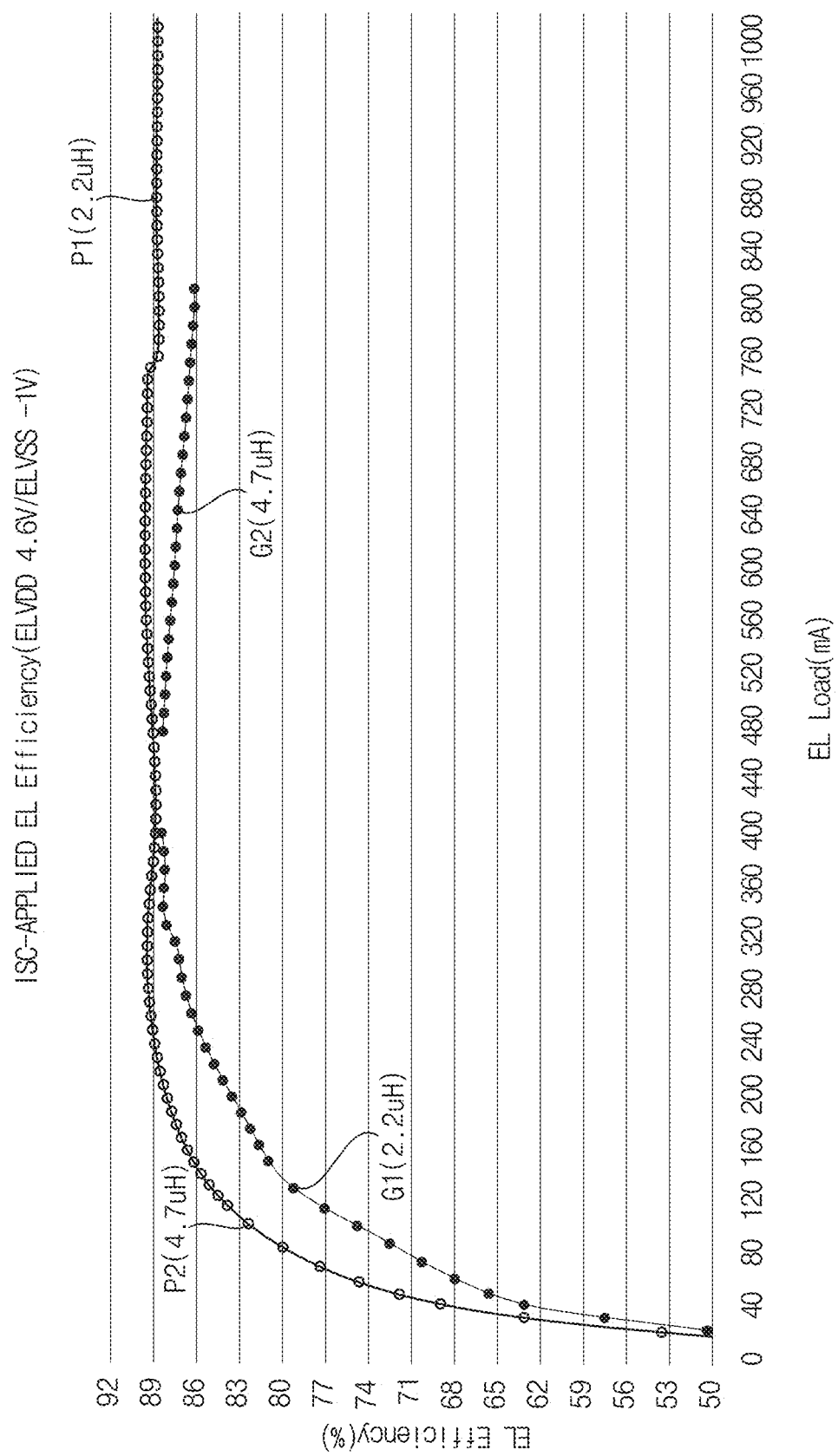
FIG. 16 is a graph showing efficiency with respect to a load of a first inductor and a second inductor according to embodiments.

FIG. 16 is a graph showing efficiency with respect to a load of a first inductor and a second inductor according to embodiments.

Referring to FIG. 16, when a first display device is driven with a relatively high load, a second inductor having 2.2 µH may be set in the first display device. In this case, since load efficiency of the first display device corresponds to a right portion P1 of a first graph G1, the first display device may exhibit relatively high efficiency, and power consumption of the first display device may be relatively reduced. Similarly, when a second display device is driven with a relatively low load, a second inductor having 4.7 µH may be set in the second display device. In this case, since load efficiency of the second display device corresponds to a left portion P2 of a second graph G2, the second display device may exhibit relatively high efficiency, and power consumption of the second display device may be relatively reduced.

In other words, after the display device is manufactured, the inductor may be changed depending on the type of the display device so that the display device may exhibit maximum efficiency. According to the embodiments of the present disclosure, the display device 100 may include a mode selector 310 configured to generate first and second inductor selection driving signals ISC0 and ISC1, and a feedback loop 330 configured to change a parameter value of a second DC-DC converter 230, which is for generating a current corresponding to an inductor L, based on the first and second inductor selection driving signals ISC0 and ISC1, so that even when the inductor L is changed after the display device 100 is manufactured, the second DC-DC converter 230 may generate a current corresponding to the changed inductor L. Accordingly, an oscillation phenomenon of an output voltage of the second DC-DC converter 230 or a malfunction of the second DC-DC converter 230 may be prevented from occurring in the display device 100. In addition, the display device 100 may exhibit relatively high efficiency, and power consumption of the display device 100 may be relatively reduced. In other words, a lifespan of a battery of the display device 100 may be relatively increased.

Figure 17:
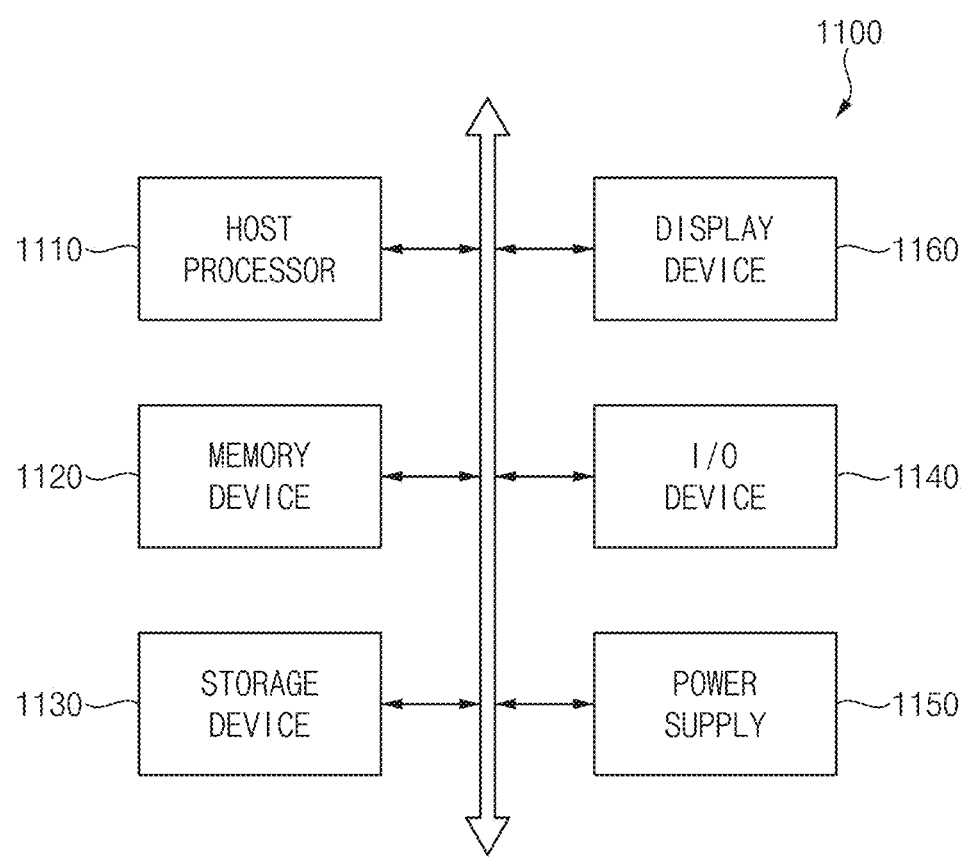
FIG. 17 is a block diagram illustrating an electronic device including a display device according to embodiments.

FIG. 17 is a block diagram illustrating an electronic device including a display device according to embodiments.

Referring to FIG. 17, the electronic device 1100 may include a host processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electronic devices, etc.

The host processor 1110 may perform various computing functions. In some embodiments, the host processor 1110 may be a microprocessor, a central processing unit ("CPU"), an application processor (AP), a graphic processing unit (GPU), etc. The host processor 1110 may be coupled to other components via an address bus, a control bus, a data bus, etc. Further, the host processor 1110 may be coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, etc. The I/O device 1140 may include an input device such as a keyboard, a keypad, a mouse device, a touchpad, a touch-screen, etc and an output device such as a printer, a speaker, etc. The power supply 1150 may provide power for operations of the electronic device 1100. The display device 1160 may be coupled to other components via the buses and/or other communication links.

The display device 1160 may include a display panel including a plurality of pixels, a controller 150, a data driver, a gate driver, a power supply unit, and the like. In this case, the power supply unit may include a first DC-DC converter and a second DC-DC converter, and the second DC-DC converter may include a mode selector, a calculator, a feedback loop, a pulse generator, an inductor, a switch, and the like. According to the embodiments, the display device 1160 may include the mode selector configured to generate first and second inductor selection driving signals, and the feedback loop configured to change a parameter value of the second DC-DC converter, which is for generating a current corresponding to the inductor, based on the first and second inductor selection driving signals, so that even when the inductor is changed after the display device 1160 is manufactured, the second DC-DC converter may generate a current corresponding to the changed inductor. Accordingly, an oscillation phenomenon of an output voltage of the second DC-DC converter or a malfunction of the second DC-DC converter may be prevented from occurring in the display device 1160.

In some embodiments, the electronic device 1100 may be implemented as a cellular phone, a smart phone, a tablet computer, a digital television ("TV"), a 3D TV, a virtual reality ("VR") device, a personal computer, a home appliance, a laptop computer, a personal digital assistant, a portable multimedia player, a digital camera, a music player, a portable game console, a car navigation system, etc.

Although embodiments of the present disclosure have been described above, it will be understood by those of ordinary skill in the art that various changes and modifications can be made to the present disclosure without departing from the idea and scope of the present disclosure as set forth in the appended claims.

The present disclosure may be applied to various electronic devices that may include a display device. For example, the present disclosure may be applied to numerous electronic devices such as vehicle display devices, ship display devices, aircraft display devices, portable communication devices, exhibition display devices, information transmission display devices, and medical display devices.

What is claimed is:

1. A power supply unit comprising:
a first direct current (DC)-DC converter configured to generate a first power supply voltage; and
a second DC-DC converter configured to generate a second power supply voltage,
wherein the second DC-DC converter includes:
an inductor;
a mode selector configured to receive at least one signal including information on an inductance value of the inductor and to generate an inductor selection driving signal based on the at least one signal; and
a feedback loop configured to receive the inductor selection driving signal and to change a parameter value for generating a current flowing through the inductor based on the inductor selection driving signal.

2. The power supply unit of claim 1, wherein the at least one signal including the information of the inductance value of the inductor includes a first signal including one of a first mode and a second mode, the first mode corresponds to an inductor having a first inductance value and the second mode corresponds to an inductor having a second inductance value.

3. The power supply unit of claim 2, wherein whether the first signal includes the first mode or the second mode is determined according to a connection state of a pin of the power supply unit.

4. The power supply unit of claim 2, wherein the at least one signal including the information of the inductance value of the inductor includes a second signal including one of a first mode and a second mode, the first mode of the second signal corresponds to the inductor having the first inductance value, and the second mode of the second signal corresponds to the inductor having the second inductance value.

5. The power supply unit of claim 4, wherein whether the second signal includes the first mode or the second mode of the second signal is determined according to a selection of a user.

6. The power supply unit of claim 4, wherein the inductor selection driving signal includes a first inductor selection driving signal or a second inductor selection driving signal,
wherein the first inductor selection driving signal includes information for generating a current corresponding to the inductor having the first inductance value, and
wherein the second inductor selection driving signal includes information for generating a current corresponding to the inductor having the second inductance value.

7. The power supply unit of claim 6, wherein the mode selector is configured to generate the first inductor selection driving signal or the second inductor selection driving signal based on the first signal and the second signal.

8. The power supply unit of claim 7, wherein the mode selector is configured to:

generate the first inductor selection driving signal when the first mode of the first signal and the first mode of the second signal are received, generate the second inductor selection driving signal when the first mode of the first signal and the second mode of the second signal are received, generate the first inductor selection driving signal when the second mode of the first signal and the first mode of the second signal are received, and generate the second inductor selection driving signal when the second mode of the first signal and the second mode of the second signal are received.

9. The power supply unit of claim 1, wherein the feedback loop includes a loop compensator and a current sensing trimmer.

10. The power supply unit of claim 9, wherein the loop compensator includes a variable resistor and a variable capacitor.

11. The power supply unit of claim 10, wherein the loop compensator is configured to receive the inductor selection driving signal, to vary the variable resistor into a resistor having a resistance value corresponding to the inductor, and to vary the variable capacitor into a capacitor having a capacitance corresponding to the inductor.

12. The power supply unit of claim 9, wherein the current sensing trimmer is configured to receive the inductor selection driving signal and to vary a trimming range corresponding to the inductor.

13. The power supply unit of claim 1, wherein the feedback loop is configured to generate a parameter change signal including changed parameter information.

14. The power supply unit of claim 13, wherein the second DC-DC converter further includes:

a switch connected to the inductor; and a pulse generator configured to receive the parameter change signal, to generate a gate pulse signal based on the parameter change signal, and to control the switch based on the gate pulse signal.

15. A display device comprising:

a power supply unit including a first direct current (DC)-DC converter configured to generate a first power supply voltage and a second DC-DC converter configured to generate a second power supply voltage; and a display panel including pixels to which the first and second power supply voltages are provided, wherein the second DC-DC converter includes:

an inductor;

a mode selector configured to receive at least one signal including information on an inductance value of the inductor and to generate an inductor selection driving signal based on the at least one signal; and a feedback loop configured to receive the inductor selection driving signal and to change a parameter value for generating a current flowing through the inductor based on the inductor selection driving signal.

16. The display device of claim 15, wherein the at least one signal including the information of the inductance value of the inductor includes a first signal including one of a first mode and a second mode, the first mode corresponds to an inductor having a first inductance value, and the second mode corresponds to an inductor having a second inductance value, and wherein whether the first signal includes the first mode or the second mode is determined according to a connection state of a pin of the power supply unit.

17. The display device of claim 16, wherein the at least one signal including the information of the inductance value of the inductor includes a second signal including one of a first mode and a second mode, the first mode of the second signal corresponds to the inductor having the first inductance value, and the second mode of the second signal corresponds to the inductor having the second inductance value, and wherein whether the second signal includes the first mode or the second mode of the second signal is determined according to a selection of a user.

18. The display device of claim 17, wherein the inductor selection driving signal includes a first inductor selection driving signal or a second inductor selection driving signal, wherein the first inductor selection driving signal includes information for generating a current corresponding to the inductor having the first inductance value, and wherein the second inductor selection driving signal includes information for generating a current corresponding to the inductor having the second inductance value.

19. The display device of claim 15, wherein the feedback loop includes a loop compensator and a current sensing trimmer, and wherein the loop compensator includes a variable resistor and a variable capacitor.

20. The display device of claim 19, wherein the loop compensator is configured to receive the inductor selection driving signal, to vary the variable resistor into a resistor having a resistance value corresponding to the inductor, and to vary the variable capacitor into a capacitor having a capacitance corresponding to the inductor, and wherein the current sensing trimmer is configured to receive the inductor selection driving signal and to vary a trimming range corresponding to the inductor.

21. A method for driving a power supply unit, the method comprising:

receiving first and second signals;

providing a first inductor selection driving signal or a second inductor selection driving signal to a feedback loop based on the first and second signals; and changing a parameter value of a direct current (DC)-DC converter based on the first or second inductor selection driving signal.

22. The method of claim 21, wherein, when the feedback loop receives the first inductor selection driving signal, the feedback loop changes a parameter value of the DC-DC converter, which is for generating a current flowing through a first inductor, and wherein, when the feedback loop receives the second inductor selection driving signal, the feedback loop changes a parameter value of the DC-DC converter, which is for generating a current flowing through a second inductor.

23. The method of claim 21, wherein changing the parameter value of the DC-DC converter based on the first or second inductor selection driving signal includes:

generating a parameter change signal including changed parameter information;

providing the parameter change signal to a pulse generator; and generating a gate pulse signal based on the parameter change signal.

24. The method of claim 21, wherein, after receiving the first and second signals, the method further comprises:

checking a value of the second signal when the first signal is a first value;

performing driving the DC-DC converter with the first inductor selection driving signal corresponding to a first inductor when the value of the second signal is a third value;

performing driving the DC-DC converter with the second inductor selection driving signal corresponding to a second inductor when the value of the second signal is a fourth value;

turning off pixels;

checking a value of the first signal when the pixels are turned off;

performing driving the DC-DC converter with the first inductor selection driving signal corresponding to the first inductor when the value of the first signal is the first value; and performing driving the DC-DC converter with the second inductor selection driving signal corresponding to the second inductor when the value of the first signal is a second value.

25. The method of claim 24, wherein an inductance value of the first inductor and an inductance value of the second inductor are different from each other.

26. The method of claim 21, wherein, after receiving the first and second signals, the method further comprises:
checking a value of the second signal when the first signal is a second value;
performing driving the DC-DC converter with the first inductor selection driving signal corresponding to a first inductor when the value of the second signal is a third value; and
performing driving the DC-DC converter with the second inductor selection driving signal corresponding to a second inductor when the value of the second signal is a fourth value.

27. The method of claim 21, wherein, before receiving the first and second signals, the method further comprises:
turning on the power supply unit; and
checking a current connection state of a hardware pin of the power supply unit.

* * * * *